April 3, 1928.
W. F. MOTTIER
HAYRAKE
Filed Sept. 18, 1920
1,664,699
2 Sheets-Sheet 1
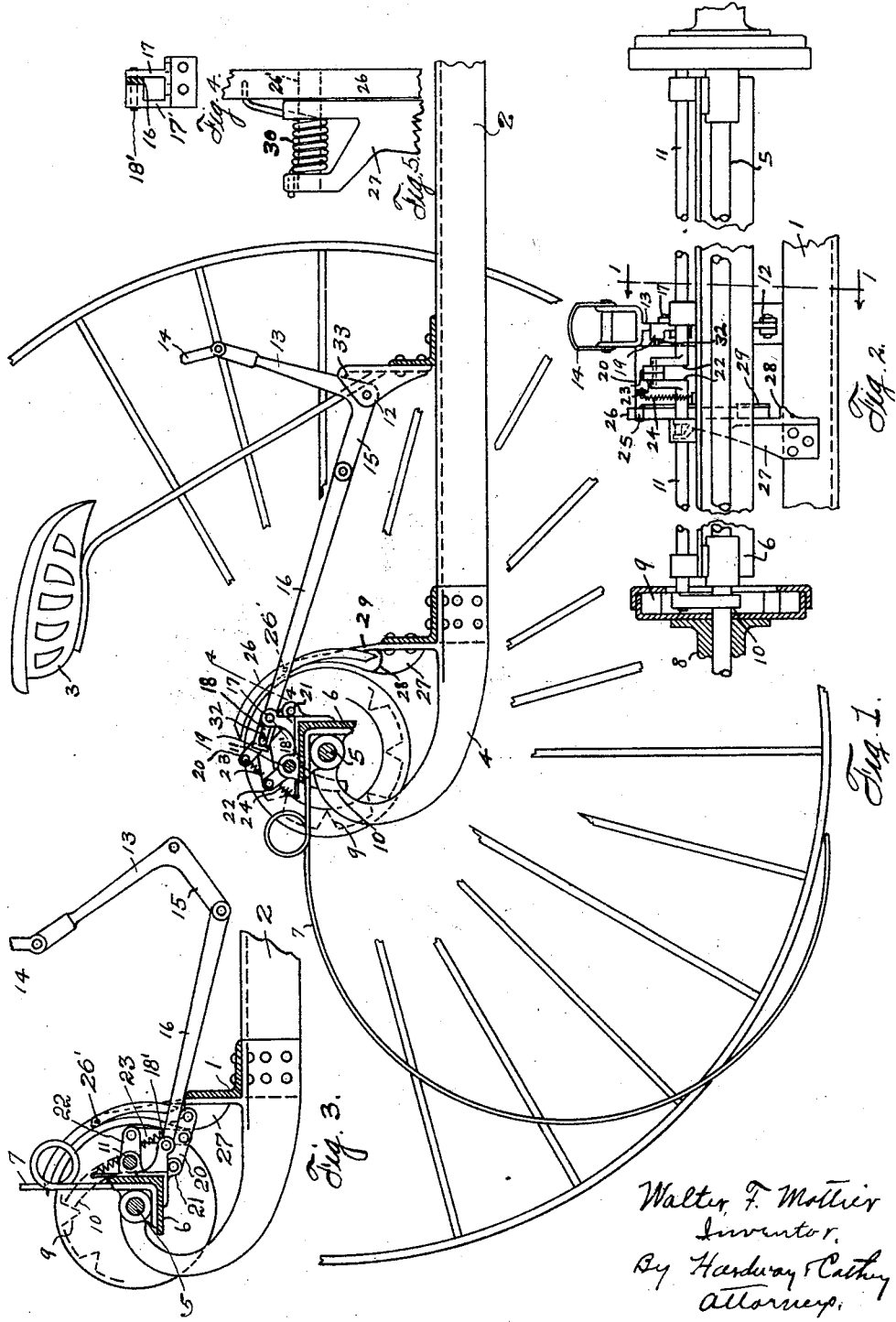

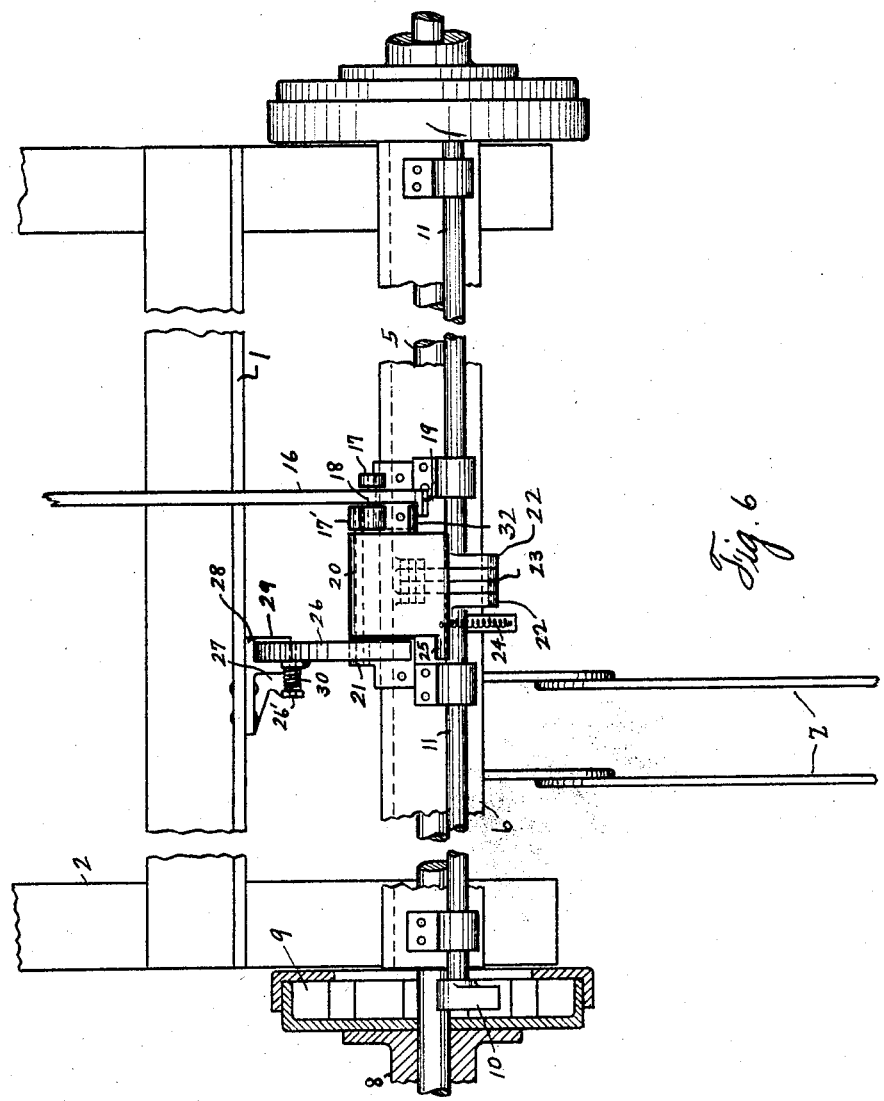

Patented Apr. 3, 1928.

1,664,699

UNITED STATES PATENT OFFICE.

WALTER F. MOTTIER, OF EL CAMPO, TEXAS.

HAYRAKE.

Application filed September 18, 1920. Serial No. 411,178.

This invention relates to new and useful improvements in a hay rake and has particular relation to a machine constructed for the purpose of raking hay, alfalfa and the like.

One object of the invention is to provide a machine of the character described having a novel and improved means for controlling the dumping movements of the rake.

Another object of the invention is to simplify the operation of the machine by the use of controlling means which may be adapted to different makes of hay rakes and in this connection it should be understood that the invention relates primarily to a means for controlling the movements of the rake, proper, rather than to the machine in its entirety.

With the above and other objects in view the invention has particular relation to certain novel features of construction, operation and arrangement of parts, an example of which is given in this specification and illustrated in the accompanying drawings, wherein:—

Figure 1 is a longitudinal, sectional view taken on the line 1, 1 of Figure 2.

Figure 2 is a fragmentary rear view of the machine shown partially in section.

Figure 3 shows a fragmentary sectional view also taken on the line 1, 1 of Figure 2, but showing the rake in dumping position.

Figure 4 is a sectional view showing a pair of spaced lugs taken on the line 4—4 of Figure 1.

Figure 5 shows an enlarged fragmentary view of a pivoted gate, and

Figure 6 shows an enlarged fragmentary plan view of the machine partly in section.

Referring now more particularly to the drawings wherein like numerals of reference designate similar parts in each of the figures, the numeral 1 refers to the main frame to which the thill 2 is attached for draft purposes. A seat 3 is arranged upon the frame for the driver, as shown. Extending rearwardly from the frame are two arms 4, only one being shown in Figures 1 and 3, said arms being so formed as to provide a pivotal mounting, as at 5 for an angle bar 6 which serves as a head to which the rake teeth 7 are secured. The arrangement of these parts is such that the rake teeth will lie close to the ground as shown in Figure 1, or be raised to the position shown in Figure 3.

For the purpose of manually operating the rake teeth, a connection is arranged between the rake head and the wheels 8 upon which the machine travels. These wheels are each mounted for rotation at opposite ends of the rake head, and each is formed with an inside ratchet 9 with which may engage a dog 10 secured to the outer end of the rod 11 which is pivotally mounted on the rake head. Normally this dog remains disengaged from the ratchet, but it is required to engage therewith whenever the rod 11 is moved for this purpose. It will be noted that each rod 11 is eccentric with respect to the wheels 8, so that engagement of the dogs with the ratchets will necessarily result in locking the rake head to the wheels for movement therewith; the rake teeth are thereby raised through a predetermined distance until the dogs are again released from engaging position.

The general construction above described is in common use. In effect it provides simply a lock between the rake head and wheels such that the teeth will be properly raised to dumping position. The specific means heretofore known for actuating the dogs into and out of engaging position relative to the ratchet teeth have not, however, been entirely satisfactory owing to the uncertainty of their operation, and the difficult lever manipulations that they have necessitated. It is with this phase of the mechanism that my invention is primarily concerned. The parts hereinafter described represent novel and distinct improvements over the actuating means in common use and which I have above referred to.

Mounted pivotally upon the frame of the machine, as at 12, is a lever 13 which is preferably operated by foot and may be equipped with a suitable strap or stirrup 14 for facilitating both push and pull movements. The lower end of this lever has a rigid arm 15 to the free end of which one end of the link 16 is pivoted and the other end of this link slides between the spaced lugs 17, 17' which are carried by the rake head and a pin 18' extending through the slot 18 of the link 16. The rear end of the link 16 is outturned at right angles forming the catch 19. A swinging plate 20 is hinged between the ears 21 carried on the rake head. Between this plate and each rod 11, I have arranged a self-adjusting connection consisting of a crank 22, one secured to each rod and links 23 pivotally attached thereto and to the plate as well. This plate is maintained in normal position as represented in Figure 1 under the tension of a spring 24 or other equivalent means and in this position it will be noted that the dogs 10 are each withheld from engagement with the ratchet.

The plate 20 is provided with a laterally projecting stud 25, (see Figure 2), whose function is to travel around a swinging gate 26 of novel formation. This gate, as shown in the figures, is arcuate in form and is pivoted at the point 26' to the upper end of the web or flange 27 which is secured to the main frame 1. The gate 26 projects out from the web 27 toward the swinging plate 20 and is in concentric relation to the wheels 8 and the pivotal connections between the rake head 6 and the arms 4 as well. In the several figures of the drawings the gate 26 forming a guideway is shown as mounted in a vertical plane, so that it has relatively an upper and a lower end. Spaced below the lower end of said gate there is a stop 28 which is carried by the web 27 and which is provided for a purpose to be hereinafter described. In front of the lower end of the gate 26, the web has an outturned flange 29, against which said lower end is normally held by the spring 30 whose ends are attached to said gate and the upper end of the web, respectively, thus forming a spring gate; that is, is permits the stud 25 traveling around the outer periphery of the gate 26 to pass between it and the flange 29 only when proceeding downwardly. The return movement must, of necessity be made around the inside of the gate 26.

The swinging plate 30 has a boss 32 which projects out from its edge opposite the stud 25 and which normally is in front of the catch 19 of the link 16.

In the operation of the parts which have been described it will be noted that the stud 25, which projects laterally from the swinging plate is, in normal position, as shown in Figure 2, slightly in the rear of the upper end of the gate 26. This stud may be moved forwardly into position above the upper end of said gate by a very slight manipulation of the lever 13 in a counterclockwise direction, which communicates motion through the link 16 for this purpose, and causes the catch 19 to engage the boss 32 and in turn causes the plate 20 to be swung slightly further away from the rake head at the same time. This in turn causes the two rods 11 to be moved sufficiently to bring the dogs 10 into engaging relation with the teeth of the ratchets 9. As the machine is traveling over the ground during these movements, the rake head is locked with the wheels 8 and caused to turn from the position indicated in Figure 1 to that shown in Figure 3, the stud 25 following around the outward periphery of the gate 26 all the while until it has passed through between the flange 29 and the lower end thereof and lodges against the stop 28. Continued travel of the machine causes the rake to go on turning with the ground wheels, but the angle between the swinging plate 20 and the rake head 6 being now constantly reduced, the links 23, connecting the swinging plate with the cranks 22 on the rods 11 act to turn these rods sufficiently to disengage the dogs 10 from engagement with the ratchets. The rake is now free to descend of its own weight and during this movement the stud 25 will be diverted by the gate to the inside thereof and will move up around said side to its original position.

The movement of the rake in dumping and returning to original, or operative, position is practically automatic as a very slight pull on the lever 13 will move the arm 15 and link 16 out of straight line position, and the pressure of the hay against the rake teeth will then operate to partially rotate the rake head and swing the plate 20 around and the stud 25 will engage the forward edge of the gate 26 and follow it around, causing the rake head to lock with the ground wheels to dump the load, and then to be released therefrom and descend of its own weight, as hereinabove explained.

The mechanism above described also constitutes means for holding the rake to the ground against pressure, such as is exerted by accumulating hay and means also for enabling the operator to hold the rake teeth indefinitely in suspended position whenever it is so desired. When the rake teeth are close to the ground the parts will be disposed as in Figure 1 where it is noted that the arm 15 and the link 16 are in substantial straight line relation and to hold them in this relation a suitable stop 33 is employed to limit the forward movement of the lever 13. According to this construction no dumping movements are possible so long as the lever 13 remains in the position shown in Figure 1.

When the lever is drawn toward the operator for the purpose of transmitting movement through the link 16, the free end of the arm 15 moves downwardly and the rake head is turned by the wheels 8, until these parts assume the position shown in Figure 3. The point of attachment of the link 16 to the rake head 6 is now below the pivotal mounting at 5 and forward pressure on the lever 13 will operate through the arm 15 and the link 16 to prevent return movement of the rake head in case it is desired to temporarily hold said head against returning to raking position.

What I claim is:—

1. The combination with a self-dump hay rake having a frame, ground wheels, a rake head, and means for locking the rake head to rotate with the wheels, of means for controlling the action of the locking means comprising a member having connection thereto and movably mounted on the rake head; means under the control of the operator for effecting an initial movement of said member whereby the locking connection is permitted to be established between the rake head and the wheels through the load carried by the rake head, said last mentioned means including a manual lever and a link connected to said lever and adapted to actuate said member and other means pivotally mounted relative to the frame and acting as a guide to prevent return movement of the member until the rake head has turned with the wheels through a predetermined distance, said guide thereafter also acting to prevent the locking of the rake head with the wheels until the rake head has returned to original position.

2. The combination with a self-dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is permitted to be established between the rake head and the wheels through the pressure of the load carried by the rake teeth, said last mentioned means including a manual lever and a link connected to said lever and adapted to actuate said member, and other means yieldably mounted upon the frame acting as a guide to prevent return movement of the member until the rake head has turned with the wheels through a predetermined distance, said guide thereafter also acting to prevent the locking of the rake head with the wheels until the rake head has returned to original position.

3. The combination with a self-dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels, said last mentioned means including a manual lever and a link connected to said lever and adapted to actuate said member, and a yieldably mounted gate carried by the frame acting as a guide to prevent return movement of the member until the rake head has turned with the wheels through a predetermined distance, said guide thereafter also acting to prevent the locking of the rake head with the wheels until the rake head has returned to original position.

4. The combination with a self-dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is permitted to be established between the rake head and the wheels, through the load carried by the rake head, said last mentioned means including a single manual lever and a single link connected to said lever and adapted to actuate said member and other means yieldingly mounted relative to the frame and acting as a guide to prevent return movement of the member until the rake head has turned with the wheels through a predetermined distance, said guide thereafter also acting to prevent the locking of the rake head with the wheels until the rake head has returned to original position.

5. The combination with a self-dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels and an arcuate swinging gate yieldably mounted on the frame and acting as a guide to prevent the return movement of the member until the rake head has turned with the wheel through a pre-determined distance said guide thereafter also acting to prevent the locking of the rake head with the wheels until the rake head has returned to original position.

In testimony whereof I have signed my name to this specification.

WALTER F. MOTTIER.